A. BRAY.
CUTTING MACHINE.
APPLICATION FILED OCT. 29, 1914.
1,190,096.
Patented July 4, 1916.
2 SHEETS—SHEET 2.
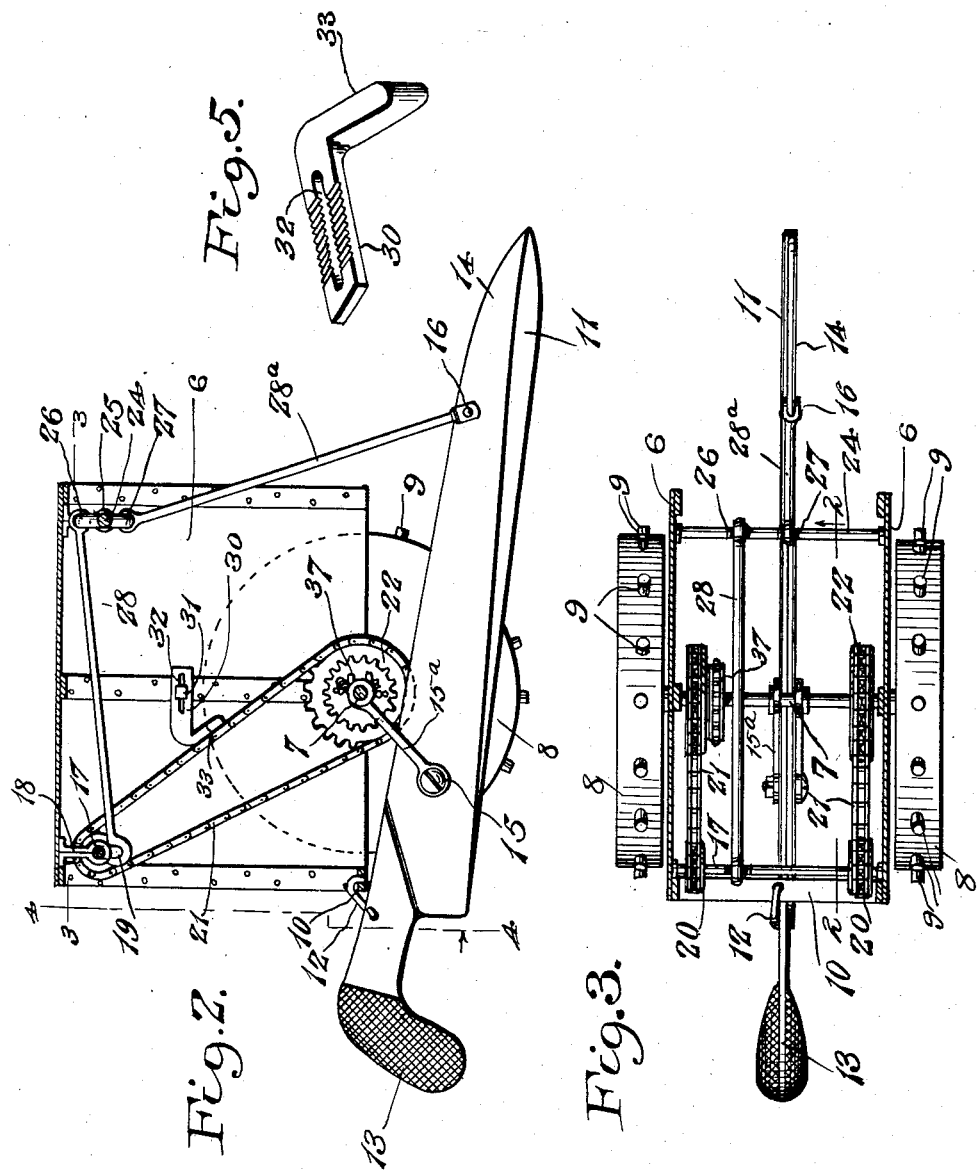

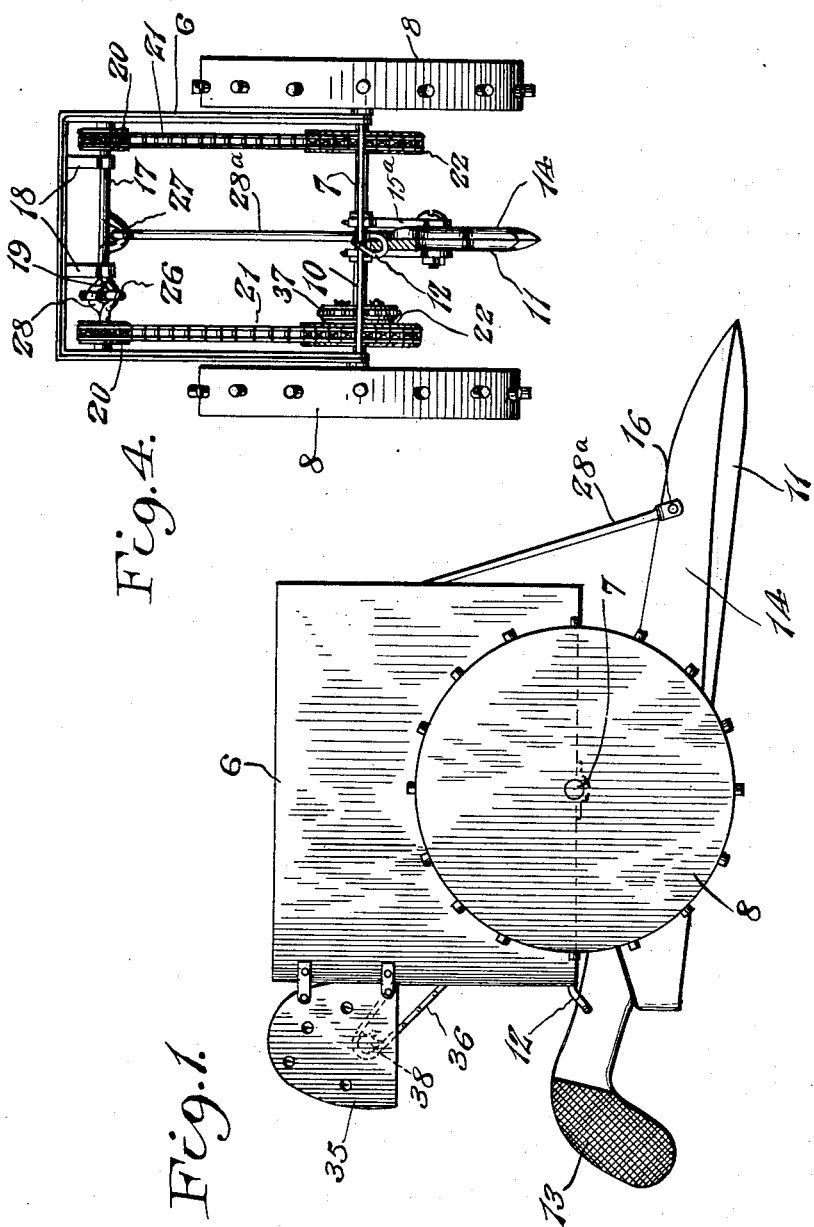

UNITED STATES PATENT OFFICE.

ANDREW BRAY, OF JACKSON, MICHIGAN.

CUTTING-MACHINE.

1,190,096.  Specification of Letters Patent.  Patented July 4, 1916.

Application filed October 29, 1914. Serial No. 869,278.

*To all whom it may concern:*

Be it known that I, ANDREW BRAY, a citizen of the United States, residing at Jackson, in the county of Jackson and State of Michigan, have invented certain new and useful Improvements in Cutting-Machines; and I do hereby declare the following to be a full, clear, and exact description of the invention, such as will enable others skilled in the art to which it appertains to make and use the same.

This invention relates to a cutting machine especially designed for cutting cloth and has for its object to provide a machine of this character of generally improved and simplified construction.

Another object is the provision of a cutting machine embodying a wheel mounted frame, a cutting knife pivotally supported in said frame and carrying a handle and a second cutting knife pivotally secured to the first cutting knife and operatively connected with one of the wheels of the frame.

With these and other objects in view, the invention consists in the novel construction, arrangement and formation of parts as will be hereinafter specifically described, claimed and illustrated in the accompanying drawings, in which:

Figure 1 represents a side elevation of the complete machine. Fig. 2 represents a longitudinal sectional view therethrough, taken on the line 2—2 Fig. 3 the recording attachment being removed. Fig. 3 represents a horizontal sectional view on the line 3—3 of Fig. 2, the recording attachment and chain tightening devices being removed. Fig. 4 represents a vertical sectional view on the line 4—4 of Fig. 2, the chain tightening devices being removed, and Fig. 5 represents a perspective view of the chain tightener.

Referring to the drawing in detail, wherein similar reference numerals designate corresponding parts throughout the several views, the numeral 6 indicates the frame of the cutting machine which is preferably constructed of sheet metal suitably braced and reinforced by strips secured to the inner face thereof and of generally inverted U-shape. A shaft 7 is rotatably mounted transversely in the lower portion of the frame 6 and carries exteriorly of said frame supporting wheels 8 having a plurality of projections 9 thereon adapted to prevent the wheels from slipping. A supporting bar 10 is secured transversely of and adjacent the lower rear extremity of the frame 6 and supports a cutting blade 11 by a hook 12 engaged at one end in an aperture in the member 10 and engaged at its opposite end in an aperture formed adjacent the rear end of the blade 11. A handle 13 is secured to the rear end of the blade 11 whereby the machine may be conveniently operated. A blade 14 is pivotally secured at 15 adjacent the rear end of the blade 11 and is provided adjacent its forward extremity with a laterally projecting pin 16. A pair of supporting members 15$^a$ is pivotally secured upon the shaft 7 and at their lower ends the members are secured to the screw 15 connecting the blades 11 and 14.

A crank shaft 17 is rotatably mounted in suitable bearing members 18 depending from the top of the frame 6 and is provided with a crank 19. A pair of sprocket wheel 20 are keyed on the shaft 17 inwardly of the side walls of the frame 6 and receive drive chains 21 extending over sprocket wheels 22 secured on the shaft 7 inwardly of the side walls of the frame. A third shaft 24 is rotatably supported adjacent the front of the frame 6 in bearings 25 supported from the top of said frame, and is provided with two cranks 26 and 27 respectively. The crank 19 of the shaft 17 and the crank 26 of the shaft 24 are connected by a pitman 28. The other crank 27 of the shaft 24 is connected with the pivoted blade 14 by a connecting rod 28$^a$ pivotally secured at its lower extremity to the laterally projecting pin 16 carried by the forward extremity of the blade 14. Chain tightening devices 30 are adjustably secured to the inner faces of the vertical portions of the frame 6 by bolts 31 threaded in suitable apertures formed in said frame and positioned in slots 32 formed longitudinally in the bodies of the members 30. Angularly directed extensions 33 are formed integral with the members 30 and are adapted to engage the chains 21 to take up the slack in the latter.

As illustrated in Fig. 1, a suitable recording device 35 is suitably supported on the frame 6 and is driven from the main shaft 7 by a chain 36 traveling over a sprocket wheel 37 secured on the shaft 7 and over a sprocket wheel 38 provided in the recording device 35.

In use, the machine is placed upon a table or other support on which is laid the material to be cut and the pointed end of the blade 11 is positioned under the goods and the blade 14 is arranged above the goods, in the usual manner. The machine is then drawn or pushed over the material to be cut rotating the chain wheels 8, which latter rotate the shafts 17 and 24 through the chains 21 and pitman 28 and operate the blade 14 through the connecting rod 28ª. The length of the cut or cuts is registered by the device 35, as will be understood.

What I claim is:

1. A cutting machine comprising a frame, a shaft rotatably mounted in said frame, supporting wheels secured on said shaft, a hook secured in the rear portion of said frame, a pair of supporting members secured to said shaft, a blade secured to the rear extremities of said hook and said supporting members, a second blade pivoted to said first blade, and driving connections between said shaft and the second mentioned pivoted blade.

2. A cutting machine comprising a frame, a shaft rotatably mounted in the lower portion of said frame, supporting wheels keyed on said shaft, a pair of shafts rotatably mounted in the upper portion of said frame, driving connections between the first mentioned shaft and one of the shafts of said pair, driving connections between the shafts of said pair, a blade supported in said frame, a second blade pivotally secured to said first blade, and driving connections between the other shaft of said pair and the second mentioned pivoted blade.

3. A cutting machine comprising a frame, a shaft rotatably mounted in the lower portion of said frame, supporting wheels keyed on said shaft, a pair of shafts rotatably mounted adjacent the upper end of said frame and having cranks, a driving connection between the first mentioned shaft and one of the shafts of the pair, driving connections between the shafts of the pair, a hook member pivotally supported in the lower portion of said frame, a blade secured to the lower extremity of said hook, a second blade pivotally secured to the first blade, and driving connections between the other shaft of the pair and the said second mentioned pivoted blade.

In testimony whereof I affix my signature in presence of two witnesses.

ANDREW BRAY.

Witnesses:
GEORGE S. BENNETT,
ARLENE CAMPBELL.

Copies of this patent may be obtained for five cents each, by addressing the "Commissioner of Patents. Washington, D. C."